Jan. 29, 1929.
A. M. KHUN
1,700,636
FLOOD TIDE AND BACKWATER VALVE
Filed Jan. 26, 1928
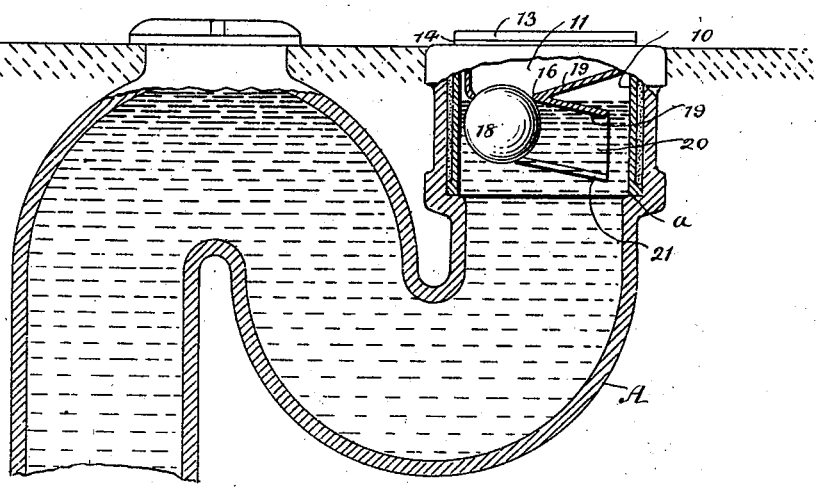
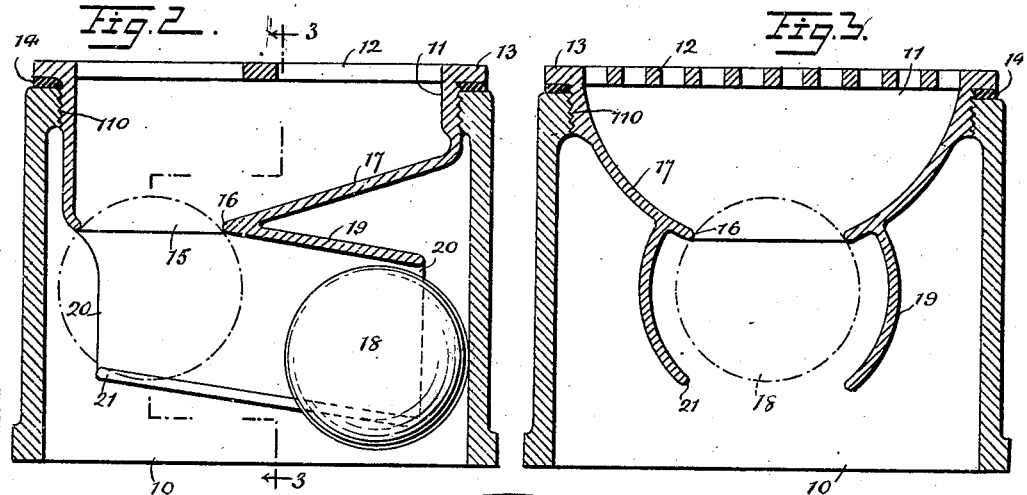
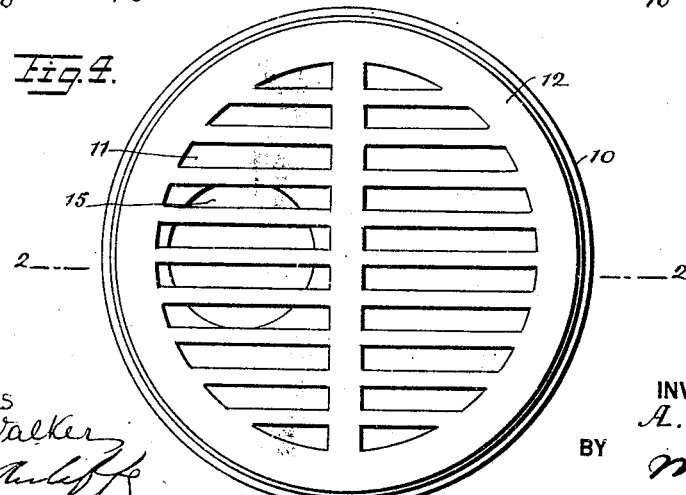
WITNESSES
H. J. Walker
INVENTOR
A. M. Khun
BY
ATTORNEY

Patented Jan. 29, 1929.

1,700,636

UNITED STATES PATENT OFFICE.

ALBERT M. KHUN, OF ELIZABETH, NEW JERSEY.

FLOOD-TIDE AND BACKWATER VALVE.

Application filed January 26, 1928. Serial No. 249,674.

My invention relates to a valve usually installed in association with a trap in the cellar of a house, and is designed to prevent flood tide and back water from entering the cellar through the trap.

Traps of the type usually employed have a disadvantage in that they tend to collect match sticks and other foreign matter at the seat of the valve and prevent the valve from seating and moving to a closed position, the valve being usually a ball valve.

The general object of my invention is to provide a valve affording maximum clearance for the escape of match sticks or other foreign matter entering the valve so that such matter cannot collect on the valve seat and prevent the valve from closing.

The manner and means whereby the above object is attained will clearly appear as the description proceeds.

Reference is to be had to the accompanying drawings forming a part of this specification, it being understood that the drawings are merely illustrative of one example of the invention.

Figure 1 is a vertical section of a valve embodying my invention, showing the same emplaced in association with a trap of known form;

Figure 2 is a central vertical section as indicated by the line 2—2 of Figure 4;

Figure 3 is a transverse vertical section on the line 3—3 of Figure 2; and

Figure 4 is a plan view of the valve.

In carrying out my invention in practice in accordance with the illustrated example, a valve is formed with a shell or body 10 of a character to be emplaced on a shoulder *a* at the base of the bell of a trap A. The shell 10 is secured by threaded connection 110. On the fitting 11 is a grid or other equivalent openwork top 12. At the top of the valve is a flange 13 directed laterally outward to rest on packing 14 disposed between said flange 13 and the top of the body 10.

The fitting 11 presents a vertical opening 15 for the downflow of water passing to the trap A, and the defining edge or wall 16 of said opening forms a valve seat at the under side. The fitting 11 presents a surface 17 inclining in all directions toward the opening 15. A ball valve 18 is provided and is adapted in the case of water rising in the body 10 to engage seat 16 and close the opening 15.

The lower portion of the fitting 11 is in the form of a tubular element or member 19 which is formed with open ends 20 in which element 19 the ball valve 18 is adapted to have lateral movement from a position at the opening 15 to a position remote from said opening. The element or member 19 is inclined from the opening 15 downwardly, and particularly is the top surface of said element inclined, the purpose being to give the ball valve 18 a tendency to roll away from the opening 15 to allow complete clearance for any matter arriving at said opening 15 through the top of the fitting 11. On the underside of member 19 is a wide longitudinal slot 21 which affords escape for foreign matter passing through the opening 15 and permitting such matter to reach and pass through the open bottom end of the valve body 10.

With the above described construction ball valve 18 in the absence of water rising in the shell or body 10 will take a position at that end of the element 19 remote from the opening 15. If, however, water should rise in the body 10 caused by flood tide or by water backing up in trap A, the rising water will cause ball valve 18 to roll along member 19 to the opening 15, that end of the opening 19 adjacent to the opening 15 being so disposed as to prevent complete passage of the ball valve 18 through said end, which end is adjacent to the side wall of the shell or body 10. The result of the construction is that the seating of ball valve 18 and the closing of the valve is insured whenever water rises in the valve shell or body 10. On the other hand, in the absence of water backing up in the body 10 the valve 18 will take the position remote from the opening 15 so that there is no opportunity for foreign matter or particles to collect at the valve seat 16 and thus prevent seating of the valve.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A flood tide and back water valve, comprising an open ended shell adapted to be secured in a member of a trap, a member secured in the upper end of the shell and having an openwork top, the member having a bottom provided with an opening, the wall of which forms a valve seat on its underside, the bottom inclining upwardly from said opening in all directions, the member being provided on the underside of its bottom with an open ended and downwardly inclined tubular valve guide having an open bottom, and a ball valve in said guide.

2. In a flood tide and back water valve, a member having an openwork top, a bottom inclined upwardly in all directions and provided with an opening therein, a downwardly inclined valve guide carried by the bottom and having curved side walls, the lower ends of which are spaced from each other, and a ball valve in said guide.

Signed at Elizabeth in the county of Union and State of New Jersey this 23rd day of January A. D. 1928.

ALBERT M. KHUN.